United States Patent
Juni

(10) Patent No.: US 8,023,780 B2
(45) Date of Patent: Sep. 20, 2011

(54) TOUCH PANEL

(75) Inventor: Noriyuki Juni, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 9 days.

(21) Appl. No.: 12/611,602

(22) Filed: Nov. 3, 2009

(65) Prior Publication Data

US 2010/0123682 A1 May 20, 2010

(30) Foreign Application Priority Data

Nov. 18, 2008 (JP) .................................. 2008-294726

(51) Int. Cl.
*G06F 3/046* (2006.01)
*G02B 6/12* (2006.01)

(52) U.S. Cl. ............ 385/14; 385/32; 385/131; 345/175; 345/176

(58) Field of Classification Search .......... 345/173–176; 385/12–14, 32, 43, 46, 129–132
See application file for complete search history.

(56) References Cited

U.S. PATENT DOCUMENTS

| 6,992,659 B2* | 1/2006 | Gettemy ........................ 345/173 |
| 7,268,771 B2* | 9/2007 | Shi et al. ........................ 345/173 |
| 7,812,831 B2* | 10/2010 | Ikeda et al. .................... 345/175 |
| 2006/0114244 A1* | 6/2006 | Saxena et al. ................. 345/175 |
| 2008/0150914 A1 | 6/2008 | Yamamoto |
| 2008/0198144 A1 | 8/2008 | Shimizu et al. |

FOREIGN PATENT DOCUMENTS

| JP | 2007-070320 A | 3/2007 |
| JP | 2008-158891 A | 7/2008 |
| JP | 2008-203431 A | 9/2008 |

* cited by examiner

*Primary Examiner* — Daniel Petkovsek
(74) *Attorney, Agent, or Firm* — Westerman, Hattori, Daniels & Adrian, LLP

(57) ABSTRACT

A touch panel 30 of the present invention comprises: a light-emitting sided-optical waveguide 33; a light-receiving sided-optical waveguide 34; and an electromagnetic induction-type digitizer 36. In the touch panel of the present invention, a position coordinate is recognized using an electronic pen by an electromagnetic induction-type digitizer 36 when high resolution is required. A position coordinate is recognized using a finger by the optical waveguides 33 and 34 when high resolution is not required. This makes it possible to materialize the touch panel 30 having a high resolution and a lower power consumption regardless of its narrow frame.

2 Claims, 2 Drawing Sheets

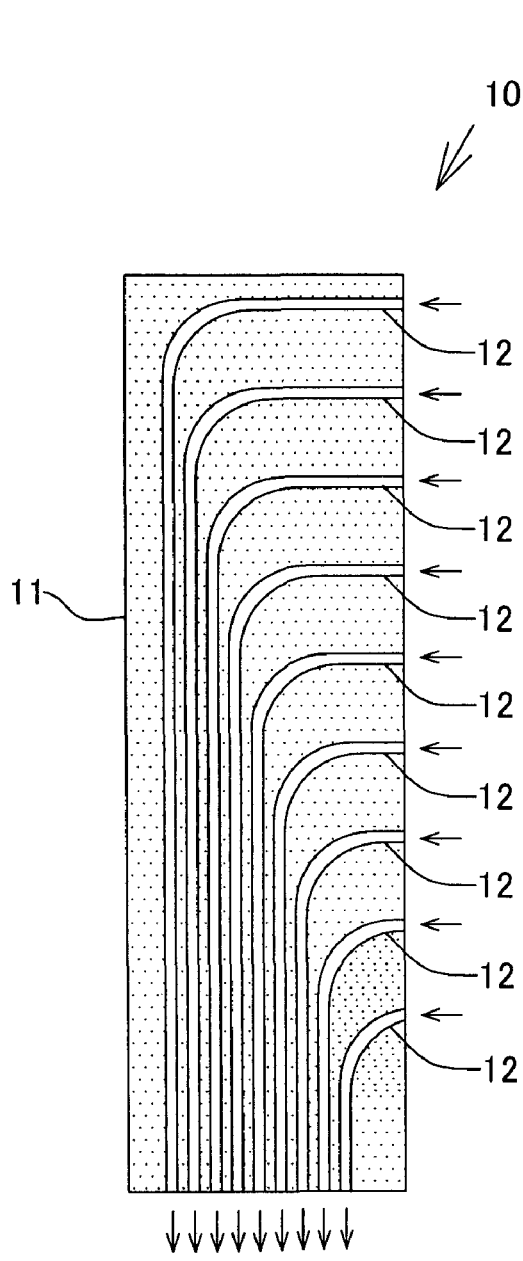
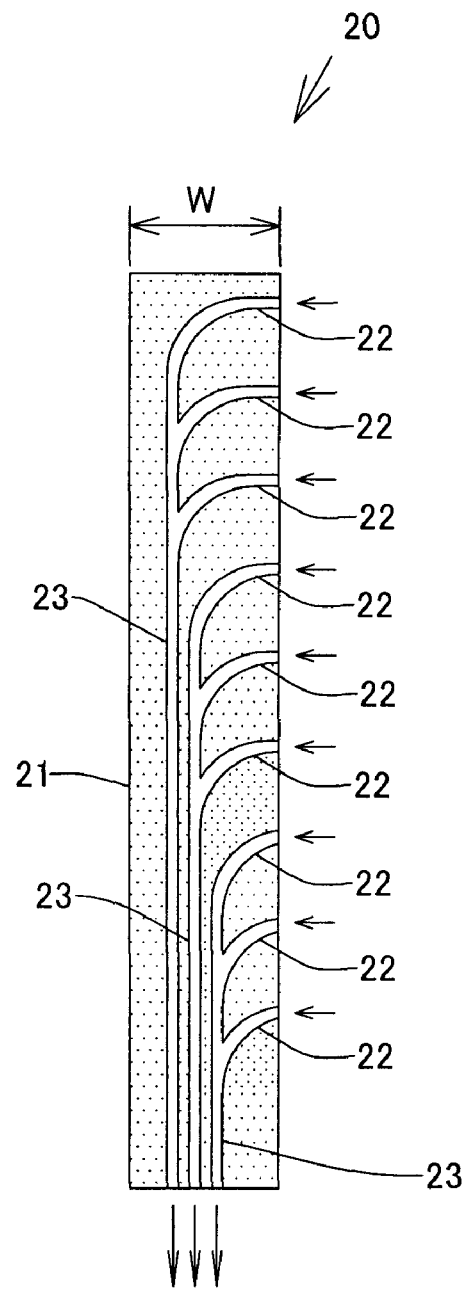
(PRIOR ART)
FIG. 1 (a)
FIG. 1 (b)

(Cross-sectional view)

(Plan view)

TOUCH PANEL

BACKGROUND OF THE INVENTION

1. Field of the Invention

The present invention relates to a touch panel and more particularly, to a touch panel with optical waveguides and an electromagnetic induction-type digitizer.

2. Description of the Related Art

Conventionally, touch panels with optical waveguides are known (For example, JP 2008-203431 A). Since optical waveguides are light-weight and capable of carrying out a high-speed signal transmission, such optical waveguides have been expected to be utilized for various kinds of electronic devices, more particularly, optical touch panels in the future.

Conventional touch panels, however, needed to increase the core density by making the core width of optical waveguides narrower and increasing the number of cores to increase resolution so that irrespective of input may be possible by a thin substance (for example, a pen) or a thick substance (for example, a finger). Therefore, such conventional touch panels had a problem that the "frame" around a display unit was wide due to large sized optical waveguides.

SUMMARY OF THE INVENTION

Touch panels having conventional waveguides have a problem in that the frame becomes wider as the resolution gets higher. It is an object of the present invention to provide a touch panel with a high resolution regardless of its narrow frame.

A touch panel according to the present invention comprises: a light-emitting sided-optical waveguide; a light-receiving sided-optical waveguide; and an electromagnetic induction-type digitizer. In the touch panel according to the present invention, a position coordinate is recognized using an electronic pen by an electromagnetic induction-type digitizer when high resolution is required. A position coordinate is recognized using a finger on optical waveguides when high resolution is not required. This enables to materialize a touch panel having a high resolution and a lower power consumption regardless of its narrow frame.

In the touch panel of the present invention, the position coordinate is recognized using an electronic pen by an electromagnetic induction-type digitizer. The electromagnetic induction-type digitizer has a high resolution (1 mm or lower). Accordingly, optical waveguides do not require high resolution (1 mm or so) so that a pen input may be detected but require a resolution (5 mm or so) such that the position coordinate can be recognized using a finger. This makes it possible to decrease the core density of the optical waveguides.

FIG. 1 (a) shows a conventional light-receiving sided-optical waveguide 10. FIG. 1 (b) shows a schematic view of a light-receiving sided-optical waveguide 20 to be used in the present invention. In the conventional light-receiving sided-optical waveguide 10, received light travels in a plurality of cores 12 embedded in a cladding 11. To obtain a high resolution, as shown in FIG. 1 (a), respective cores 12 need to be coupled to a light-receiving element (not shown in the figure) in a state that branched paths are retained.

In the light-receiving sided-optical waveguide 20 to be used in the present invention, received light travels in a plurality of cores 22 and 23 embedded in a cladding 21. However, as shown in FIG. 1 (b), received light beams can be transmitted to a light-receiving element (not shown in the figure) by coupling a plurality of core branched groups 22 to a plurality of core main paths 23 by some cores. This makes the number of the core main paths 23 decrease down to approximately one fifth, so that the width W of the light-receiving sided-optical waveguide 20 becomes narrower, which leads to make the frame of the touch panel narrower.

Further, in the touch panel of the present invention, the core branched groups 22 are coupled to the core main paths 23 to guide strong light to a light-receiving element (not shown in the figure), so that a light-emitting element with a small output (not shown in the figure) can be used.

Since the electromagnetic induction-type digitizer has lower power consumption than optical waveguide, the touch panel of the present invention has a feature of lower power consumption.

The gist of the present invention is as follows:

In a first preferred embodiment, a touch panel according to the present invention comprises: a light-emitting element; a coordinate input region; a light-emitting-sided-optical waveguide for guiding light emitted from the light-emitting element to generate light beams for crossing the coordinate input region and having an output end; a light-receiving sided-optical waveguide for receiving the light beams having crossed the coordinate input region and having an input end; and a light-receiving element for detecting the intensity of light received at the light-receiving sided-optical waveguide; and an electromagnetic induction-type digitizer provided in a lower part of the coordinate input region, wherein the light-receiving sided-optical waveguide comprises: cores; and a cladding wherein the cores are embedded, the cores each including core branched groups arranged so as to receive light beams; and core main paths for coupling the core branched groups to guide light to the light-receiving element. Although the electromagnetic induction-type digitizer is provided in a lower part of the coordinate input region, a power section and a signal processing section or the like except for an input section are not necessarily needed to be provided in the lower part of the coordinate input region.

In a second preferred embodiment of the touch panel according to the present invention, a position coordinate is inputted into an electromagnetic induction-type digitizer by an electronic pen when high resolution is required and a position coordinate is inputted by blocking light beams that cross the coordinate input region with a finger when high resolution is not required. High resolution means a resolution whose thickness is as thick as a tip of an electronic pen, that is, a resolution of about 1 mm. When high resolution is not required, the resolution means a resolution whose thickness is as thick as a finger, that is, a resolution of about 5 mm.

ADVANTAGE OF THE INVENTION

The touch panel of the present invention has a high resolution and has lower power consumption than conventional touch panels regardless of its narrow frame.

For a full understanding of the present invention, reference should now be made to the following detailed description of the preferred embodiments of the invention as illustrated in the accompanying drawings.

BRIEF DESCRIPTION OF THE DRAWINGS

FIG. 1 (a) is a schematic view of a conventional light-receiving sided-optical waveguide;

FIG. 1 (b) is a schematic view of a light-receiving sided-optical waveguide to be used in the present invention;

DESCRIPTION OF THE PREFERRED EMBODIMENTS

Figure 2:
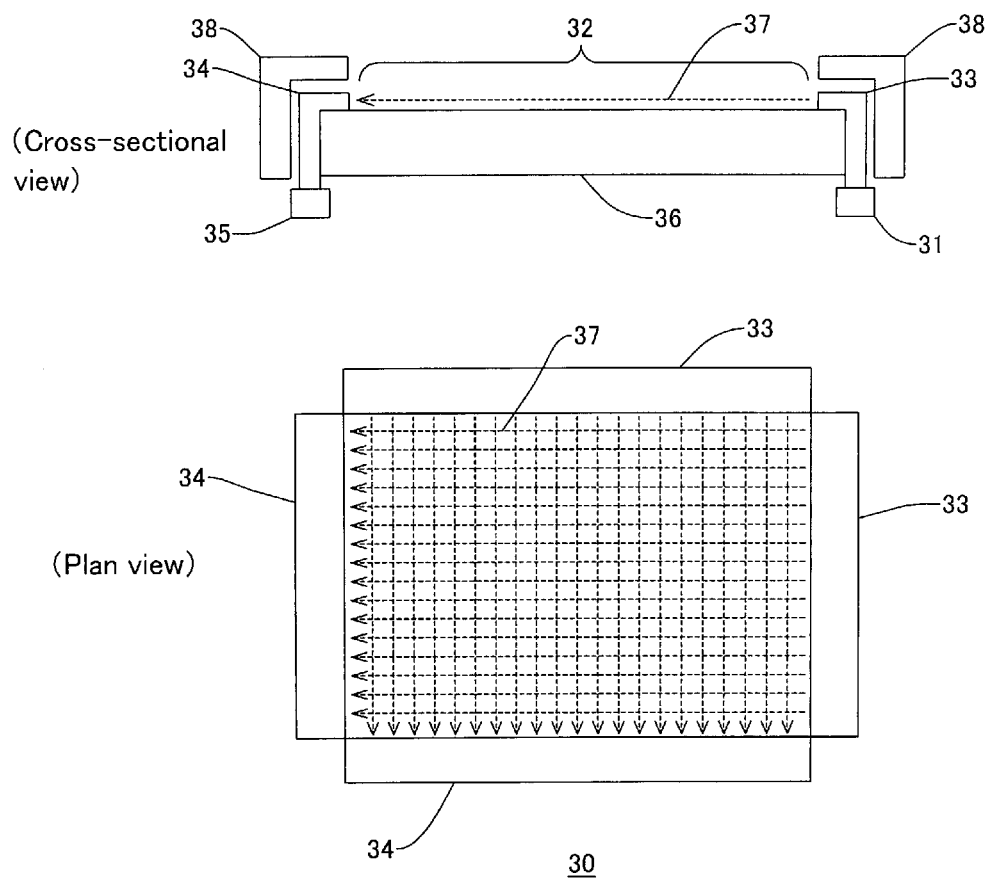
FIG. 2 shows a cross-sectional view and a plan view of a touch panel of the present invention.

The preferred embodiments of the present invention will now be described with reference to FIGS. 1-3 of the drawings. Identical elements in the various figures are designated with the same reference numerals.

[Touch Panel]

Figure 3:
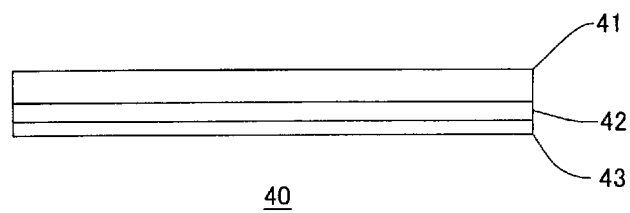
FIG. 3 is a schematic view of an electromagnetic induction-type digitizer.

As shown in FIG. 2, a touch panel 30 of the present invention comprises: a light-emitting element 31; a coordinate input region 32; a light-emitting sided-optical waveguide 33 having an output end; a light-receiving sided-optical waveguide 34 having an input end; a light-receiving element 35; and an electromagnetic induction-type digitizer 36. The light-emitting sided-optical waveguide 33 guides light emitted from the light-emitting element 31 to generate light beams 37 for crossing the coordinate input region 32. The light-receiving sided-optical waveguide 34 receives the light beams 37 having crossed the coordinate input region 32. The light-receiving element 35 detects the intensity of light received at the light-receiving sided-optical waveguide 34. The electromagnetic induction-type digitizer 36 is provided in a lower part of the coordinate input region 32.

An input section of the electromagnetic induction-type digitizer 36 includes: a drive coil layer (not shown in the figure); and a detection coil layer (not shown in the figure). A resonance circuit in an electronic pen (not shown in the figure) resonates by electromagnetic induction at a predetermined frequency of radio waves emitted by the drive coil layer. Subsequently, its resonance signal is transmitted from the electronic pen to the detection coil layer. At this time, the position of the detection coil obtained at a maximum receiving level is recognized as a position of the electronic pen (for instance, JP 2008-158891 A).

Practically, frame-shape bodies 38 are equipped with the touch panel of the present invention to cover the light-emitting sided-optical waveguide 33 and the light-receiving sided-optical waveguide 34.

As shown in FIG. 1 (b), the light-receiving sided-optical waveguide 34 to be used for a touch panel of the present invention comprises cores 22 and 23 embedded in a cladding 21. The cores 22 comprise a plurality of core branched groups 22 arranged so as to receive light beams. And the cores 23 comprise a plurality of core main paths 23 for combining the core branched groups 22 to guide light to the light-receiving element 35.

In the touch panel 30 of the present invention, when part of light passing through the coordinate input region 32 is blocked by a finger (a substance as thick as a finger), the intensity of light incident on the light-receiving element 35 is reduced. By detecting such a reduction in light intensity, it is possible to recognize the position coordinate of the finger. Upon touching the coordinate input region 32 with an electronic pen (coordinate indicator), the position coordinate of the electronic pen is recognized by the aforementioned mechanism.

[Light-Emitting Element]

Any light-emitting element may be used as the light-emitting element 31 to be used in the present invention, as long as the light-emitting element 31 generates the light beams 37 for passing through the light-emitting sided-optical waveguide 33 to cross the coordinate input region 32.

The aforementioned light-emitting element 31 is preferably a light-emitting diode or a semiconductor laser, more preferably a VCSEL (Vertical Cavity Surface Emitting Laser). A VCSEL is excellent in light transmission because light in a VCSEL is resonated in a direction perpendicular to a substrate surface and light emitted therefrom also propagates in a direction perpendicular to the substrate surface. The wavelength of light emitted from the light-emitting element 31 is within the near-infrared region (700 nm to 2500 nm).

The touch panel 30 of the present invention is so constructed that the core branched groups 22 may be coupled to the core main paths 23 in the light-receiving sided-optical waveguide 34 (FIG. 1 (b)). This enables an increase in intensity of light incident on the light-receiving element 35, which makes it possible to employ the light-emitting element 31 having an output smaller than the conventional one (for example, 0.1 mW to 3 mW).

[Coordinate Input Region]

In this specification, the word "coordinate input region" 32 refers to a region where the light beams 37 emitted from the light-emitting sided-optical waveguide 33 traverse in every direction. The electromagnetic induction-type digitizer 36 that is substantially as large as the coordinate input region 32 is provided in a lower portion of the coordinate input region 32. The touch panel 30 of the present invention provides a coordinate input with a finger by blocking the light beams 37 that cross the coordinate input region 32. Further, coordinate input is provided by an electronic pen by having the electronic pen (not shown in the figure) touch the electromagnetic induction-type digitizer 36. An open space may be provided in front of the coordinate input region 32. Alternatively, a transparent glass plate or an acrylic plate may be provided on the surface of the coordinate input region to improve scratch resistance. The surface of the glass plate or the acrylic plate may be anti-reflection (AR) treated or anti-glare treated.

[Light-Emitting Sided-Optical Waveguide]

Any light-emitting sided-optical waveguide may be used as the light-emitting sided-optical waveguide 33 as far as the light-emitting sided-optical waveguide generates light beams for crossing the coordinate input region 32 by guiding light emitted from the light-emitting element 31. The light-emitting sided-optical waveguide 33 preferably comprises: a plurality of core groups; and a cladding wherein the core groups are embedded. Typically, an end of each core is optically coupled to the light-emitting element 31 to introduce light emitted from the light-emitting element 31. The other end of each core is provided at the periphery of the coordinate input region 32 to emit the light beams 37 in the coordinate input region 32.

A core is generally made of a material having a refractive index higher than that of a cladding. A core is preferably made of a UV curable resin having excellent patterning properties. Preferred examples of such a UV curable resin include UV curable acrylic resins, UV curable epoxy resins, UV curable siloxane resins, UV curable norbornene resins, and UV curable polyimide resins.

The number of the cores within the light-emitting sided-optical waveguide 33 is determined as appropriate according to the size of the touch panel 30. The cross-sectional shape of the cores is not particularly limited, but is preferably a trapezoid or a rectangle with excellent patterning properties. The width of each of the cores is preferably 10 to 500 μm. The height of each of the cores (the length between the midpoint of an upper side and the midpoint of a lower side) is preferably 10 to 100 μm.

The cladding is generally made of a material having a lower refractive index than the cores. The material of the cladding is not particularly limited, but preferable examples thereof include glass, silicone, metals or resins and the like. The cladding may be constituted from a single layer or multiple layers. In the case of multiple layers, typically, the cladding comprises: an under-cladding layer; and an over-cladding layer. The cladding preferably has a thickness of 5 to 20 µm.

The difference in refractive index between the cores and the cladding is preferably 0.01 or higher, more preferably 0.02 to 0.2. The refractive index of a resin for forming the cores and the cladding can be increased or decreased as appropriate according to the kind and the content of an organic group introduced into the resin.

For instance, the refractive index can be increased by the introduction of a cyclic aromatic group (e.g., a phenyl group) into a resin molecule or by increasing a cyclic aromatic group content per resin molecule.

On the other hand, the refractive index can be decreased by, for example, introducing a linear or a cyclic aliphatic group (e.g., a methyl group or a norbornene group) into a resin molecule or increasing a linear or cyclic aliphatic group content per resin molecule.

The light-emitting sided-optical waveguide can be formed by any method, such as a dry etching method using plasma, a transfer method, an exposure and development method or a photobleaching method or the like.

[Light-Receiving Sided-Optical Waveguide]

The light-receiving sided-optical waveguide 34 receives light 37 having crossed the coordinate input region 32 to guide the light 37 to the light-emitting element 35. The light-receiving sided-optical waveguide 34 comprises: a plurality of cores; and a cladding 21 wherein the cores are embedded (FIG. 1 (*b*)). The cores respectively have a plurality of core branched groups 22 arranged so as to receive light beams. And the cores respectively have a core main path 23 for coupling the core branched groups 22.

When the coordinate input region 32 is rectangular, as shown in FIG. 2, light-receiving sided-optical waveguides 34 are provided on two sides oppositely faced to sides on which light-emitting sided-optical waveguides 33 are provided.

The materials, size, shape, refractive index, and manufacturing method of the cores and the cladding for the light-receiving sided-optical waveguides 34 are preferably similar to those of the aforementioned light-emitting sided-optical waveguides 33.

Typically, one end of each core branched group 22 is provided at an edge of the coordinate input region 32 to receive the light beams 37 from the coordinate input region 32. The other end of each core main path 23 is optically coupled to the light-receiving element 35 to guide light to the light-receiving element 35.

The number of the core branched groups 22 in the light-receiving sided-optical waveguide 34 is determined as appropriate according to the size of the touch panel 30. And the number of the core branched groups 22 coupled to the core main paths 23 is determined as appropriate according to the size of the touch panel 30, but is preferably from 3 to 20, more preferably 5 to 15.

Two core main paths adjacent to each other in the light-receiving sided-optical waveguide 34 are nth core main path and (n+1)th core main path. The nth core branched group belongs to the nth core main path. And the (n+1)th core branched group belongs to the (n+1)th core main path. In an edge of the coordinate input region 32, it is possible to recognize coordinates by (a substance as thick as) a finger when the closest space between branches of the nth core branch groups and the (n+1)th core branch group is set at 3 mm or more. However, it is possible to reduce the optical resolution so that (a thin substance like) an electronic pen cannot recognize the coordinates while a thick finger can recognize the coordinates.

[Light-Receiving Element]

The light-receiving element 35 to be used in the present invention converts an optical signal into an electrical signal to detect the intensity of light received at the light-receiving sided-optical waveguide 34. The light 37 detected from the light-receiving element 35 preferably has a wavelength in a near-infrared area (700 to 2,500 nm). The structure of the light-receiving element 35 is preferably a one-dimensional image sensor wherein photo diodes are aligned. Examples of such light-receiving element 35 include a Complementary Metal-oxide Semiconductor (CMOS) image sensor and a Charge Coupled Device (CCD) image sensor or the like.

[Electromagnetic Induction-Type Digitizer]

The electromagnetic induction-type digitizer 36 to be used in the present invention is generally used together with an electronic pen (coordinate indicator). As shown in FIG. 3, an input section of an electromagnetic induction-type digitizer 40 includes a display unit 41, a sensor plate 42, and a shield plate 43 in order from a visible side. A position coordinate of the electronic pen is recognized by detecting a guide signal generated between the electronic pen and the sensor plate 42. Principally, no position coordinate of other than an electronic pen is recognized.

Any display unit can be used as the display unit 41 as far as the display unit can display characters or images. For instance, a liquid crystal display panel or a plasma display panel is appropriate. In the present invention, it is preferable that the indication display of the display unit 41 also functions as the coordinate input region 32.

A plurality of antenna coils are generally incorporated into the sensor plate 42 in an X-axis direction and a Y-axis direction. The shield plate 43 prevents electromagnetic noises coming from the back side. An electromagnetic induction-type digitizer available in the market can be employed as the electromagnetic induction-type digitizer 40, for example, can be available from Wacom Co., Ltd.

[Applications]

The applications of the touch panel of the present invention are not particularly limited, but are used for personal computers, bank ATM systems, portable game devices, and tablet personal computers.

EXAMPLE

Preparation of Varnish for Forming Cladding

A varnish for forming cladding was prepared by mixing 100 parts by weight of a UV-curable epoxy-based resin having an alicyclic skeleton (EP 4080E manufactured by ADEKA CORPORATION) (Component A) and 2 parts by weight of a photo-acid-generation agent (CPI-200K manufactured by SAN-APRO Ltd.) (Component B).

[Preparation of Varnish for Forming Cores]

A varnish for forming cores was prepared by mixing 40 parts by weight of a UV-curable epoxy-based resin having a fluorene skeleton (OGSOL EG manufactured by Osaka Gas Chemicals Co., Ltd.) (Component C), 30 parts by weight of a UV-curable epoxy-based resin having a fluorene skeleton (EX-1040 manufactured by Nagase ChemteX Corporation) (Component D), 30 parts by weight of 1,3,3-tris(4-(2-(3-oxetanyl))butoxyphenyl)butane (synthesized in accordance with Example 2 in JP 2007-70320 A) (Component E), 1 part by weight of the Component B, and 41 parts by weight of ethyl lactate.

[Formation of Optical Waveguide]

The varnish for forming cladding was applied onto the surface of a polyethylene naphthalate film having a thickness of 188 μm, irradiated with UV light at 1,000 mJ/cm$^2$, and thermally-treated at 80° C. for 5 minutes to form an under-cladding layer having a thickness of 20 μm. The refractive index of the under-cladding layer as measured at a wavelength of 830 nm was 1.510.

Then, the varnish for forming cores was applied onto the surface of the under-cladding layer and thermally-treated at 100° C. for 5 minutes to form a core layer. The core layer was then covered with a photo mask (gap: 100 μm), irradiated with UV light at 2,500 mJ/cm$^2$, and thermally-treated at 100° C. for 10 minutes. An unexposed portion of the core layer was dissolved away using an aqueous γ-butyrolactone solution and thermally treating the core layer at 120° C. for 5 minutes so that a plurality of core main paths each having a width of 20 μm and a height of 50 μm, and 10 core branched groups coupled to the plurality of core main paths were formed. The refractive index of each of the cores as measured at a wavelength of 830 nm was 1.592.

Next, a varnish for forming cladding was applied so as to cover the entire aforementioned plurality of cores to form a resin layer having a thickness of 60 μm. Subsequently, the resin layer was thermally-treated at 80° C. for 5 minutes to remove bubbles around the cores. And a quartz concave-shaped molding die was pressed on the resin layer to fill the varnish for forming cladding inside the concave-shaped molding die.

The concave-shaped molding die was irradiated with UV light at 2,000 mJ/cm$^2$ from the outside to perform thermal treatment at 80° C. for 5 minutes. Subsequently, the concave-shaped molding die was released to form an over-cladding layer with a convex lens having a side sectional shape of a substantially quarter of a circle at its distal end. The over-cladding layer had a thickness of 1 mm and its refractive index as measured at a wavelength of 830 nm was 1.510. The convex lens had a radius of curvature of 1.5 mm.

The obtained optical waveguide comprises: an under-cladding layer; cores; and an over-cladding layer formed on the under-cladding layer so as to cover the cores. The under-cladding layer had a thickness of 20 μm. The cores respectively had a width of 20 μm and a height of 50 μm. The over-cladding layer had a thickness of 1 mm.

[Method for Producing Touch Panel]

Two optical waveguides were prepared as the aforementioned optical waveguides. One of the optical waveguides was the light-emitting sided-optical waveguide 33 and the other was the light-receiving sided-optical waveguide 34. The light-emitting element 31 (VCSEL manufactured by Optowell) emitting light having a wavelength of 850 nm was optically coupled to a distal end of each core main path in the light-emitting sided-optical waveguide 33 through a UV curable adhesive. The light-receiving element 35 (CMOS linear sensor array manufactured by TAOS Inc.) was optically coupled to a distal end of each core main path of the light-receiving sided-optical waveguide 34 through a UV curable adhesive. As shown in FIG. 2, these optical waveguides 33 and 34 were arranged so as to surround the coordinate input region 32 with a 5-inch opposing corner.

Next, the electromagnetic induction-type digitizer 36 (a tablet personal computer available in the market (Compaq2710P manufactured by Hewlett-Packard Company, L.P.) was located in a lower portion of the coordinate input region 32 to manufacture the touch panel 30.

The coordinate recognition was possible by both a finger and an electronic pen on this touch panel 30 and the coordinate recognition was sufficiently possible, even if an output of the light-emitting element 31 was as low as 1 mW.

Table 1 shows the number of cores, the width of the cores and light source output in Example of the present invention, and the number of cores, the width of the cores, light source output when a touch panel without electromagnetic induction-type digitizer was used and the coordinate recognition was performed at sensitivity similar to the Example as Comparative Example.

In the case of Example, "the number of cores and the width of the cores" described in Table 1 indicate the number and the width of the core main paths 23 (FIG. 1 (b)) coupled to the light-receiving element. In the case of Comparative Example, "the number of cores and the width of the cores" described in Table 1 indicate the number and the width of the core main paths 12 (FIG. 1 (a)) coupled to the light-receiving element. Table 1 indicates the number of cores and the width of the cores in a vertical axis (Y-axis), however, those in a horizontal axis (X-axis) are substantially similar to those in the vertical axis (Y-axis). "Light source output" is an output of a VCSEL.

TABLE 1

|  | Number of cores (piece) | Width of cores (mm) | Light source output (mW) |
| --- | --- | --- | --- |
| Example | 10 | 0.2 | 1 |
| Comparative Example | 50 | 1 | 5 |

Measurement Methods

[Refractive Index]

A varnish for forming cladding and a varnish for forming cores were respectively applied onto a silicon wafer by spin coating to form a film of the varnish, and the silicon wafer was used as a sample for measuring the refractive index of a cladding and cores. Measurement of refractive index was performed using a prism coupler (manufactured by Sairon Technology, Inc.).

[Width and Height of Core]

An optical waveguide was cut crosswise using a dicing saw (DAD522 manufactured by DISCO Corporation), and the cutting surface of the optical waveguide was observed using a laser microscope (manufactured by Keyence Corporation) to measure the width and height of each core.

This application claims priority from Japanese Patent Application No. 2008-294726, which is incorporated herein by reference.

There has thus been shown and described a novel touch panel which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A touch panel comprising:
a light-emitting element;
a coordinate input region;

a light-emitting sided-optical waveguide for guiding light emitted from the light-emitting element to generate light beams for crossing the coordinate input region and having an output end;

a light-receiving sided-optical waveguide for receiving the light beams having crossed the coordinate input region and having an input end;

a light-receiving element for detecting the intensity of light received at the light-receiving sided-optical waveguide; and an electromagnetic induction-type digitizer provided in a lower part of the coordinate input region, wherein the light-receiving sided-optical waveguide comprises: cores; and a cladding wherein the cores are embedded, the cores each including core branched groups arranged so as to receive light beams; and core main paths for coupling the core branched groups to guide light to the light-receiving element.

2. The touch panel according to claim 1, wherein the number of the core branched groups coupled to the core main paths is 3 to 20.

* * * * *